Nov. 3, 1970

F. M. FLYNN     3,537,777

MICRODENSITOMETER BILATERAL ADJUSTABLE FIELD SLIT SCANNING
APERTURE INCLUDING AN OVERRIDE MECHANISM

Filed Sept. 22, 1967     3 Sheets-Sheet 1

*INVENTOR.*
Frank M. Flynn

BY Edward H. Loveman

*ATTORNEY*

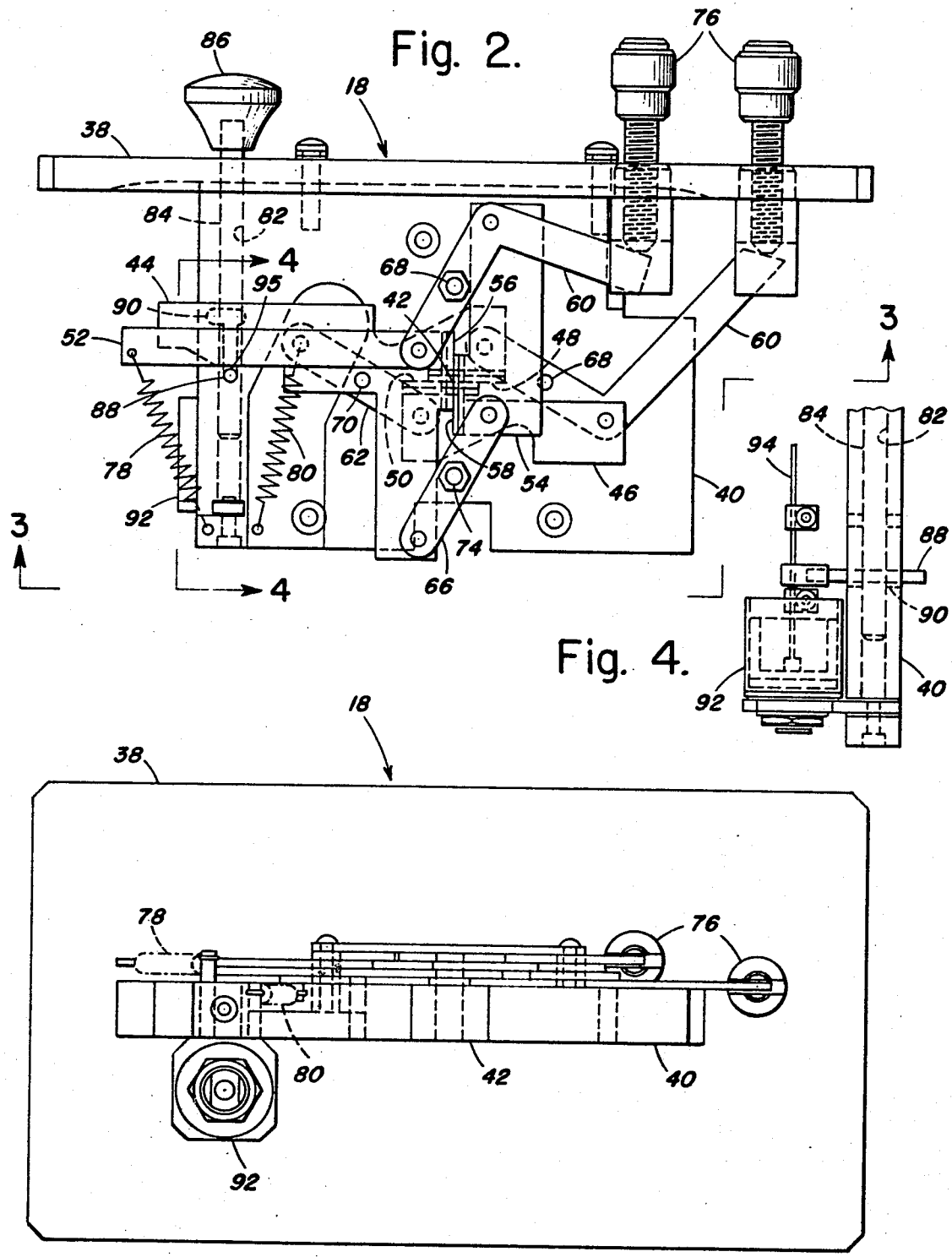

INVENTOR.
Frank M. Flynn
BY
Edward H. Loveman
ATTORNEY

United States Patent Office

3,537,777
Patented Nov. 3, 1970

3,537,777
MICRODENSITOMETER BILATERAL ADJUSTABLE FIELD SLIT SCANNING APERTURE INCLUDING AN OVERRIDE MECHANISM
Frank M. Flynn, Binghamton, N.Y., assignor, by mesne assignments, to Technical Operations, Incorporated, Burlington, Mass., a corporation of Delaware
Filed Sept. 22, 1967, Ser. No. 669,856
Int. Cl. G02f *1/30*
U.S. Cl. 350—271                                    9 Claims

ABSTRACT OF THE DISCLOSURE

This invention relates to an adjustable bilateral scanning aperture for a microdensitometer scanning system. The aperture adjusting mechanism consists of a multiple parallelogram linkage system which will facilitate adjustment of the scanning aperture dimensions to extremely accurate tolerances. The adjustment is accomplished through manual manipulation of one or more control knobs and threaded calibration screw members.

---

This invention relates to microdensitometer scanning systems and, more particularly, to a novel bilateral adjustable field slit mechanism for controlling the size of the field on an illuminated object or film sample.

In science and industry, microdensitometers are widely used to meet the requirements of photometric measurement. Primarily, although not limited thereto, microdensitometers are applied to the evaluation of processed photographic films and plates and other transparent samples containing fine detail. Among areas of application, some of the more important with respect to microdensitometry, are serial reconnaissance, photogrammetry, industrial radiography, research radiology, and quality control in the manufacture and technology of photographic materials.

Generally, a microdensitometer scanning system may include, among other elements and components, an illuminator, a carriage and table on which the object or sample to be scanned is placed, various scanning objective, optical projection and magnification lenses, and scanning apertures. The output signal generated in a photomultiplier by variations in the projected light at the scanning aperture may be transmitted to suitable data processing apparatus not forming a part of the present invention. Since microdensitometry is concerned with the measurement of extremely minute particles of a particular object being scanned, prior art microdensitometers have utilized high ranges of object magnification in their scanning systems. These magnifications have frequently been as high as one thousand times the actual object size being scanned.

Although, as mentioned hereinabove, microdensitometry is usually applied in the higher magnification ranges, at times it becomes necessary to obtain signals at the photomultiplier read-out at extremely low levels of magnification. A microdensitometer scanning system which readily lends itself to this end is described in my copending application No. 633,155.

Although the aforementioned microdensitometer scanning system has obviated many of the major problems encountered in microdensitometers, particularly when used for low level magnification, significant drawbacks remain in evidence. An extremely important aspect of microdensitometer scanning systems lies in the provision of a field slit or aperture which will facilitate the illumination of an object, such as a film sample, for accurate scanning, without the detrimental scattering of the generated illuminating light rays. In essence, the ideal condition is for the illuminated area to exactly match the scanning area without the scattering of any light. However, in practice, this is physically impossible, and in actuality some of the light will always be diffracted at the edges of the field slit. Experimentation had indicated that the ratio of the linear width or dimension of the illuminated field to the effective size of the scanning field should be in the range of 8:1 to 15:1. This, in effect, will cause the field slit edge diffraction pattern to project externally of the scanned area.

One of the most important considerations in providing a controlled, illuminated field, is in the utilization of an extremely accurately dimensioned field slit or aperture, which serves to establish the scanning criteria when applied, for example, to the spectogram of a particular metallic element. When the aperture is opened in order to move the sample or object so as to facilitate scanning of another area thereof, it becomes extremely difficult to again duplicate the previous aperture dimensions. This will prevent the accurate scanning or measurement of minute film or other object samples. Prior art field slit apertures generally consisted of replaceable filter glass inserts, or inserts of metallic coatings on glass, which were inserted into the microdensitometers as required by the particular scanning systems in use. These field slits and apertures are lacking in the optical and mechanical precision demanded by highly sophisticated microdensitometer scanning systems.

The present invention overcomes the foregoing and other disadvantages and shortcomings encountered in prior art microdensitometers, and particularly microdensitometer scanning systems, through the utilization of a novel and unique bilateral adjustable field slit or aperture mechanism which may be readily installed in presently used microdensitometers. Essentially, the present invention provides for an adjustable field slit aperture which may be instantaneously or rapidly opened for full field scanning, up to 20,000 microns, and then returned to its original position. The original field slit aperture must be dimensionally duplicated to within a tolerance of one micron by employing a precise and accurate mechanism. The mechanism for the bilateral field slit aperture is formed of two sets of movable parallelogram linkages, forming substantially a pantograph, and having engaging jaw blade members movable in response to an externally applied force. By using a parallelogram construction, the jaw blade members maintain a parallel orientation during all positions throughout the full range of aperture openings. A feature of the adjustable bilateral field slit mechanism is that it is of a compact construction which may be assembled into a modular unit and in a simple manner installed in existing microdensitometers.

Accordingly, it is a primary object of the present invention to provide a novel and unique microdensitometer adjustable bilateral field slit mechanism.

Another object of the present invention is to provide a novel bilateral field slit mechanism as described herein, adapted to accurately control the size of the illuminated field on an object.

A further object of the present invention is to provide a bilateral field slit mechanism constituted of a multiple parallelogram linkage arrangement which will allow the aperture jaws to move in a predetermined parallel motion.

A more specific object of the present invention is to provide a bilateral field slit mechanism as described herein which may be installed as a module in a microdensitometer, the mechanism having an aperture controlled by a movable parallelogram linkage arrangement, and incorporating means for accurately restoring the aperture to its original dimensions after opening for full field viewing.

These and other objects and many of the attendant advantages of this invention will be readily appreciated as the same becomes better understood by reference to the following detailed description when considered in connection with the accompanying drawings in which:

FIG. 2 is a plan view of an adjustable bilateral field slit mechanism according to the present invention;

FIG. 3 is a side plan view along line 3—3 in FIG. 2;

FIG. 4 is a fragmentary elevational view along line 4—4 in FIG. 2; and

Figure 1:
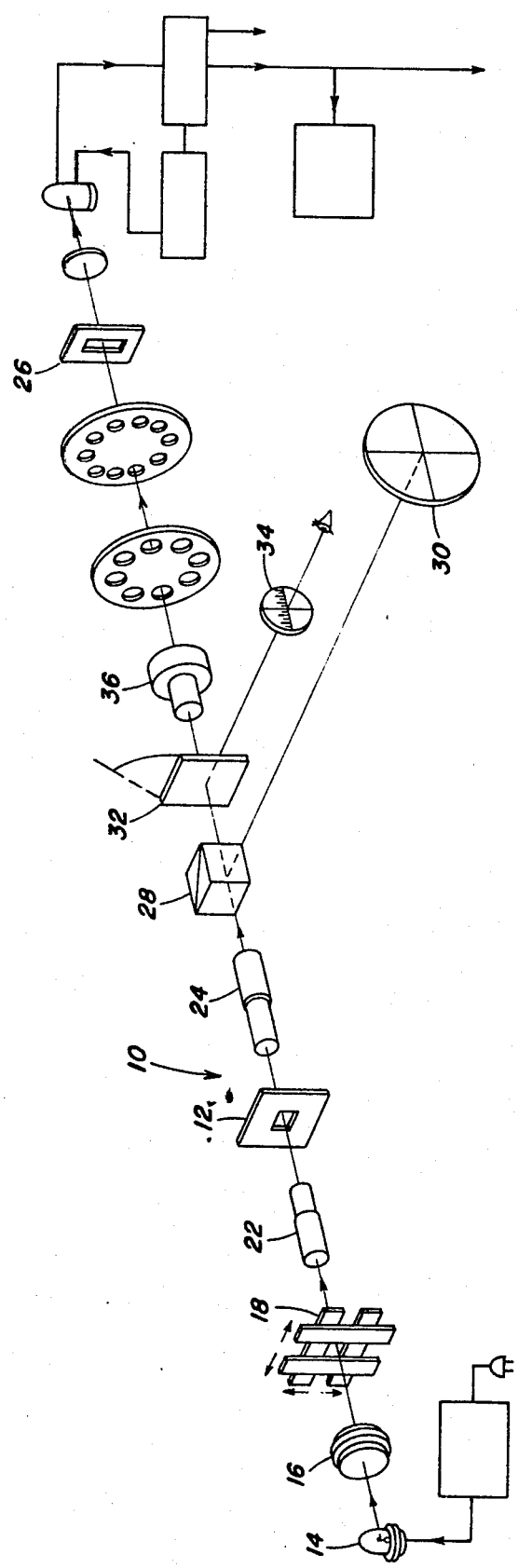
FIG. 1 is a diagrammatic view of a typical microdensitometer scanning system according to the present invention.

Referring now in particular to the drawings, wherein like reference characters designate like or corresponding parts throughout the several views, FIG. 1 illustrates a microdensitometer scanning system, generally designated as 10. A sample film or slide 12 which is to be scanned may be positioned on a suitable support in the path of a beam of light emanating from light source or illuminator 14. Before the light impinges on the sample film 12, it may pass through a suitable condenser 16, and through a field aperture 18 which may have vertical and horizontal jaw blade members to provide bilateral aperture-slit adjustment. The size of the aperture opening between the jaw blade members is, of course, determined by the desired scanning objective, as described in greater detail below. A high resolution illuminator optics assembly 22 is adapted to isolate or pinpoint the finite portion of the sample film 12 which is to be scanned in a manner more fully described below. A scanning objective lens 24 will magnify the illuminated scanned portion of the sample film, and project the image of the illuminated sample film 12 toward a pre-selected scanning aperture 26, the size of which is chosen based on the extent of the sample film portion or element scanned.

If desired, a prism 28 may be interposed in the light path so as to facilitate viewing of the scanned portion of the sample film 12 through the medium of a viewing screen 30. Additionally, a flip-in mirror 32 may at times be placed in the path of the light in order to permit viewing of the scanned sample film through a secondary viewer ot micsoscope 34.

Between the scanning objective lens 24 and scanning aperture 26, a compounding projective or optical assembly 36 may be interposed, as is well known in the art. If desired, a plurality of compounding projectives possessing various magnification ratios may be mounted on a turret-type support and selectively used in the microdensitometer scanning system as required. One such microdensitometer employing this type of scanning system is the General Aniline & Film Corporation Model No. 650.

The adjustable bilateral field slit aperture mechanism according to the present invention, is designated generally as 18 in FIGS. 2, 3 and 4 of the drawings. The mechanism 18 includes a front cover plate 38 which will facilitate attachment of mechanism 18 to a microdensitometer. Suitably fastened in generally perpendicular or normal position to cover plate 38 is support plate 40 which may be provided with a suitable central opening 42.

A first pair of movable jaw blade members 44 and 46, having coactig and separable blades 48 and 50, respectively, are superposed on support plate 40 in spaced relation thereto. Similarly, a further pair of movable jaw blade members 52 and 54, having coacting and separable blades 56 and 58, respectively, are positioned in superposed relation with jaw blade members 44 and 46.

Each of the jaw blade members 44, 46, 52 and 54 are interconnected by pivotable linkage members 60, 62, 64 and 66, respectively, which are pivotally mounted on support plate 40. Linkage members 60, 62, 64 and 66 are adapted to swivel about pivot pins 68, 70, 72 and 74, respectively, which pass therethrough and through support plate 40. While linkage member 62 comprises a straight elongate element interconnecting jaw blade members 46 and 54, and linkage member 66 is a straight elongate element interconnecting jaw blade members 44 and 52, linkage members 60 and 64 are bell cranks, having one end each attached respectively to jaw blade members 44 and 52, whereas the other end of each bell crank remains free. From the foregoing, it becomes readily evident that the jaw blade members 44, 46, 52 and 54 are connected by the linkage members into two sets of parallelograms, or into a pantograph. Consequently, moving the free end of bell crank linkage member 60 downwardly, will separate jaw blade members 44 and 46 into parallel spaced relationship. Similarly, moving the free end of bell crank linkage member 64 downwardly, will separate jaw blade members 52 and 54 into parallel spaced relationship. This, in effect, will then form a aperture or slit between the jaw blade members, of a size dependent upon the extent of displacement of the free ends of bell crank linkage members 60 and 64.

Since the microdensitometer scanning system requires an extremely accurately defined bilateral slit or aperture size for particular scanning sequences, the displacement of the free ends of bell crank linkage members 60 and 64 must be controlled. This is accomplished by mounting a pair of manually operable precision-calibrated screws 76 on cover plate 38, and passing therethrough in threaded engagement with the plate, so that the screws 76 contact the bell cranks adjacent to the free ends thereof.

When the screws 76 are threaded exteriorly of cover plate 38, the aperture formed by the jaw blade members is automatically closed or restricted under the urging of tension spring members 78 and 80, which are attached respectively to jaw blade member 52 and support plate 40, and jaw blade member 44 and support plate 40. The spring members 78 and 80 force the free ends of bell crank linkage members 60 and 64 into contact with screws 76 under normal scanning conditions.

At times, when viewing of the entire sample or movement thereof to another position is desired, the bilateral field slit aperture may be rapidly opened to full size, possibly up to 20,000 microns. This is accomplished by providing a slot 82 in support plate 40, and which also extends through cover plate 38. An actuator rod 84 having a control knob 86 attached to one end thereof extends into slot 82. A projecting rod portion 88 extends from actuator rod 84 and is adapted to slide within slot 82. A cross or T-slot 90 is provided in support plate 40 in connection with slot 82. In order to open the bilateral field slit aperture to maximum size, control knob 86 is pulled away from cover plate 38, thereby causing actuator rod 84 to slide upwardly in slot 82. Concurrently, projecting rod portion 88 will move up into T-slot 90 and lift jaw blade member 44. This, in turn, will cause the parallelogram linkage arrangement to move all of the jaw blade members apart. At the point of maximum rod lift, knob 86 may be rotated so as to move projecting rod portion 88 into the head of T-slot 90 and thus lock the entire mechanism into aperture-open position.

When it is desired to restore the bilateral field slit aperture to its previous scanning opening, a simple rotation of control knob 86 will disengage projecting rod portion 88 from the head of the T-slot 90 and permit the jaw blade members to close under the influence of tension spring members 78 and 80. In order to avoid damage to the rather delicate mechanism, a dashpot 92 may be fastened to support plate 40, and connected to projecting rod portion 88 by means of a slide wire 94. The dashpot will counteract to some extent the spring force exerted by tension spring members 78 and 80, and cause the jaw blade members to decelerate near the end of their closing movement.

Figure 5:
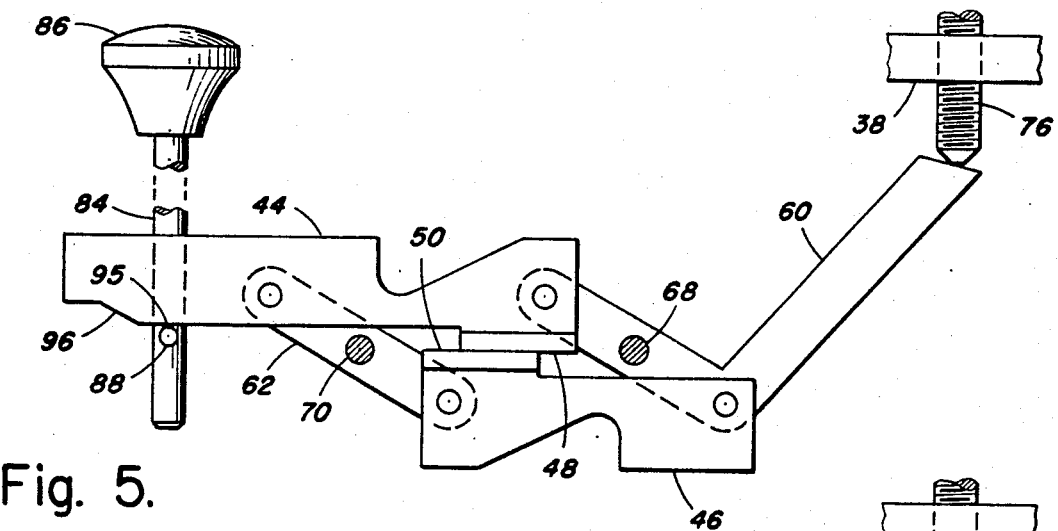
FIGS. 5, 6 and 7 are schematic views showing various operative positions of one pair of jaw blade members of the bilateral field slit mechanism according to the present invention.
Figure 6:
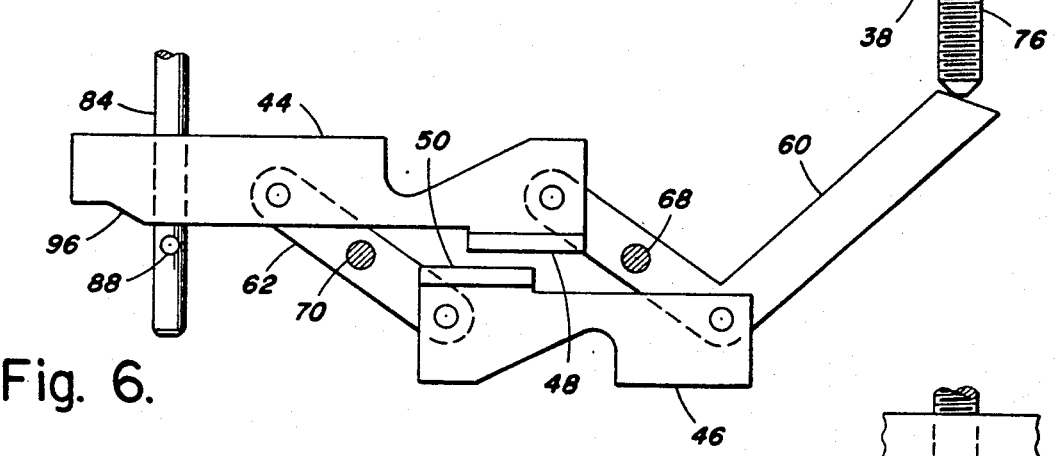
Figure 7:
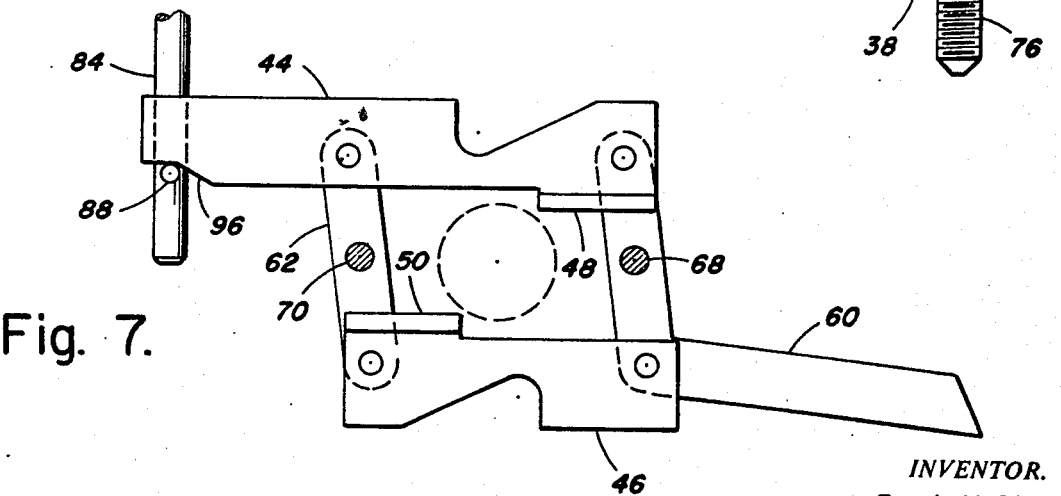

A somewhat clearer illustration of the motion of the jaw blade members may be had by referring to FIGS. 5, 6 and 7 of the drawings, which schematically demonstrate the movement of one pair of the jaw blade members, in this instance, 44 and 46. Thus, FIG. 5 shows the jaw blade members in closed position, with projecting rod portion 88 being in contact with a surface 95 on jaw blade member 44. Downward adjustment of screw 76 will cause the bell crank linkage member 60 to pivot clockwise around pin 65 to separate jaw blade members 44 and 46 by a predetermined amount whereby jaw blade member 44 moves longitudinally to the right and upwardly and jaw blade member 46 moves to the left and down as shown in FIG. 6. In order to fully separate the jaw blade members 44 and 46 the control knob 86 is pulled away from jaw blade 44 whereby projecting rod portion 88 contacts camming surface 96 and pulls the jaw blade member 44 upwardly so as to separate the latter from jaw blade member 46 (FIG. 7). Release of the projecting rod portion 88 permits it to drop down and close jaw blade members 44 and 46 under the urging of the tension spring members 78 and 80.

All of the jaw blade members are machined to extremely close tolerances so as to avoid the contamination of the spaces therebetween py dirt or other foreign matter.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. In a microdensitometer scanning system adapted to project the image of an illuminated object toward a scanning aperature, a bilateral adjustable field slit mechanism comprising:
   a support,
   a first pair of movable cooperative jaw blade members,
   a second pair of movable cooperative jaw blade members, said pair of jaw blade members being positioned relative to said first pair of jaw blade members so as to define a generally rectangular adjustable field slit aperture,
   a linkage means pivotally mounted on said support and interconnecting said first and second pairs of jaw blade members in operatively movable relationship,
   adjustable means mounted on said support and coacting with said linkage means for controlling the dimensions of said field slit aperture defined by said jaw blade members, and
   means operatively coupled to said paired jaw blade members for overriding said adjustable means to rapidly open said jaw blade members into maximum field slit aperture position.

2. A system as defined in claim 1 wherein said linkage means comprises a four-bar parallelogram linkage pivotally fastened to each of said pair of movable jaw blade members.

3. A system as defined in claim 2 wherein said parallelogram linkage includes a bell crank pivotable about a pin member mounted in said support, said bell crank having one end attached to one of said jaw blade members and its distal end in contact with said adjustable means.

4. A system as defined in claim 1 wherein said adjustable means include means for manual control of said linkage means so as to facilitate dimensional manipulation of the field slit aperture.

5. A system as defined in claim 4 including a pair of said manual control means each adapted to facilitate manipulation of one pair of said jaw blade members.

6. A system as defined in claim 5 including means adapted to impart a field slit aperture closing force to said jaw blade members in opposed relation to the force imparted to said jaw blade members by said interconnecting linkage means.

7. A system as defined in claim 1 wherein said last-mentioned means comprises a manually actuatable control rod,
   a projecting portion extending from said control rod and adapted to contact a camming surface on at least one of said jaw blade members, and
   slot means in said jaw blade member, said projecting portion being adapted to cooperatively engage said slot means so as to lock said paired jaw blade members into field slit aperture maximum opening relationship.

8. A system as defined in claim 7 wherein said control rod may be manually manipulated so as to disengage said projecting portion and said slot means, and
   including yieldable means connected to at least one of said jaw blade members and adapted to urge said pairs of jaw blade members into normally closed relationship.

9. A system as defined in claim 8 including means controlling the closing velocity of said pairs of cooperative jaw blade members.

References Cited
UNITED STATES PATENTS 2,964,998   12/1960   Middlestadt _____ 350—271

RONALD L. WIBERT, Primary Examiner

O. B. CHEW II, Assistant Examiner